(12) United States Patent
Berscheit et al.

(10) Patent No.: US 7,952,836 B1
(45) Date of Patent: May 31, 2011

(54) VARYING THICKNESS PARTIAL ETCH RAILS FOR DISK DRIVE HEAD SUSPENSIONS

(75) Inventors: Gary J. Berscheit, Watertown, MN (US); Shane D. Kruse, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 673 days.

(21) Appl. No.: 11/743,988

(22) Filed: May 3, 2007

(51) Int. Cl.
*G11B 5/56* (2006.01)
*G11B 21/16* (2006.01)

(52) U.S. Cl. .................................. 360/244.9
(58) Field of Classification Search ............... 360/244.9, 360/244.2, 244, 240
See application file for complete search history.

(56) References Cited

U.S. PATENT DOCUMENTS

| | | | |
|---|---|---|---|
| 4,996,616 A | 2/1991 | Aoyagi et al. | |
| 5,461,525 A * | 10/1995 | Christianson et al. | 360/244.8 |
| 5,877,923 A | 3/1999 | Khan et al. | |
| 5,999,372 A | 12/1999 | Peterson et al. | |
| 6,104,572 A | 8/2000 | Williams et al. | |
| 6,697,226 B1 | 2/2004 | Narayan et al. | |
| 6,751,065 B2 | 6/2004 | Smith et al. | |
| 7,430,096 B1 * | 9/2008 | Bjorstrom et al. | 360/244.9 |
| 2002/0034039 A1 * | 3/2002 | Hagen | 360/97.01 |
| 2003/0231431 A1 | 12/2003 | Bhattacharya et al. | |
| 2006/0260118 A1 | 11/2006 | Takikawa et al. | |

* cited by examiner

*Primary Examiner* — Julie Anne Watko
(74) *Attorney, Agent, or Firm* — Faegre & Benson LLP

(57) ABSTRACT

A load beam or load beam component having rails for use with a disk drive head suspension. The load beam or component is formed from a sheet of material having a first thickness. One or more polygons, beams or other structures having the full first thickness are formed in the rails by partial etching other portions of the rails to a non-zero second thickness that is less than the first thickness. The multi-thickness structures in the rails enhance the operational performance characteristics of the load beam or load beam component.

20 Claims, 5 Drawing Sheets

VARYING THICKNESS PARTIAL ETCH RAILS FOR DISK DRIVE HEAD SUSPENSIONS

FIELD OF THE INVENTION

The invention relates generally to disk drive head suspensions. In particular, the invention is a rail structure for a load beam or other component of a head suspension.

BACKGROUND OF THE INVENTION

The load beams of disk drive head suspensions often include rails to stiffen the rigid regions of the suspensions. Rails of these types can take any of a wide variety of configurations, and are disclosed generally in the following U.S. patents and publications, all of which are incorporated herein by reference.

| Inventor | U.S. Pat. No./Publication No. |
| --- | --- |
| Aoyagi et al. | 4,996,616 |
| Khan et al | 5,877,923 |
| Narayan et al. | 6,697,226 |
| Smith et al. | 6,751,065 |
| Peterson et al. | 5,999,372 |
| Bhattacharya et al | 2003/0231431 |
| Takikawa et al. | 2006/0260118 |

FIG. 4 is a cross sectional illustration of a prior art load beam rail having a full partial etch thickness. The reduced thickness rail extends along the full length of the load beam and has lower mass than a full thickness rail, thereby enhancing the shock performance of the load beam. Unfortunately, rails of this type exhibit resonance frequency mode sensitivity (e.g., $1^{st}$ bending mode) to rail thickness variations due to partial etching process variations. Prior art rails having partial etched channels with full thickness tips along the length of the load beam, as shown in the cross sectional illustration of FIG. 5, have reduced sensitivity to this rail thickness variation. However, the extra mass of the full thickness tip can have a negative impact on shock performance.

There remains, a continuing need for improved load beam rail structures. In particular, there is a need for load beams that provide high shock level performance. A load beam providing high shock level performance and high resonance performance (e.g., resistance to mechanical bending in the first bending mode) would be especially desirable. The performance characteristics of the load beam will preferably be insensitive to manufacturing process variability. To be commercially viable the load beam should be capable of being efficiently manufactured.

SUMMARY OF THE INVENTION

The present invention is a head suspension load beam or load beam component that provides high levels of performance for both shock and resonance bending mode specifications. One embodiment of the invention includes rails having thicknesses that vary along a length of the rails. The rails include one or more substantial first thickness portions having a first thickness and one or more substantial second thickness portions having a second thickness that is less than the first thickness. The first thickness portions can be beam structures in the middle of the rail to enhance the first bending mode performance of the load beam. The second thickness portions, which are formed by partial etching in one embodiment, enhance the shock level performance of the load beam.

DETAILED DESCRIPTION OF THE PREFERRED EMBODIMENTS

Figure 1:
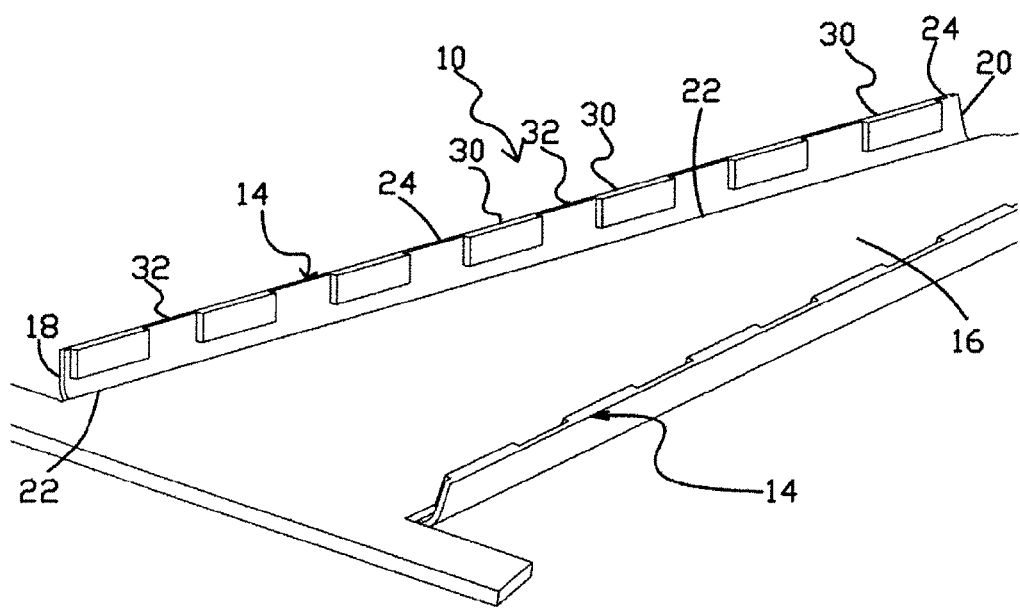
FIG. 1 is an isometric view of a portion of a load beam having rails in accordance with one embodiment of the invention.

FIG. 1 is an illustration of a portion of a load beam 10 having a central or base region 16 and rails 14 in accordance with one embodiment of the invention. Rails 14 extend from the side edges of the base region 16 and have a proximal end 18, a distal end 20, a base edge 22 adjacent to the base region of the load beam 10, and a free or tip edge 24. As shown, the rails 14 include a plurality of first thickness portions 30 in the form of structures such as polygons having a first thickness, and second thickness portions 32 having a non-zero second thickness that is less than the first thickness. First thickness portions 30 are spaced apart from one another along the length of the rails 14 by the second thickness portions 32. The rails 14 therefore vary in thickness in a dashed or step function along their length. In the embodiment shown, the first thickness portions 30 are located adjacent to the tip edges 24 of the rails 14 and do not extend all the way to the base edge 22. Second thickness portions 32 are located between the first thickness portions 30 and the base edges 22 of the rails. The portions of the rails 14 having the first thickness portions 30 therefore also vary in thickness along their height between the base edge 22 and tip edge 24. First thickness portions 30 and second thickness portions 32 both cover substantial portions of the rails 14 and provide substantial contributions to the operational performance of the load beam 10.

Load beam 10 and rails 14 can be manufactured by conventional photolithography, chemical etching and mechanical forming processes. By way of example, the portions of load beam 10 corresponding to second thickness portions 32 of rails 14 can be formed by partial etching flat stainless steel stock. The portions of the load beam 10 corresponding to the first thickness portions 30 have the full thickness of the stock in this embodiment (i.e., the first thickness portions are not etched). After the etching process, the rails 14 can be formed out of the plane of the stock by mechanical bending processes.

In the embodiment shown in FIG. 1, the first thickness portions 30 all have the same length and height. In other embodiments, the length and/or height of the first thickness portions 30 can vary over the length of the rails 14. The number and spacing of the full thickness portions 30 can also vary from that shown in FIG. 1. Although the rails 14 have a relatively constant height along their length in the illustrated embodiment, the height of the rails can vary in other embodiments. In still other embodiments the rails can be formed from more than one bend (e.g., can have a generally V-shaped or U-shaped cross section). Furthermore, in the illustrated embodiment of the invention all portions of the rails have either the first or second thickness (i.e., the rails essentially consist of the first and second thickness portions). However, in other embodiments the thicknesses of portions of the rail can continuously vary or otherwise have more than two different thicknesses.

Load beams having rails such as 14 offer a number of important advantages. The partial etched or otherwise relatively thin portions of the rails enhance the shock level performance of the load beam. The full thickness or otherwise relatively thick portions enhance the first bending mode performance of the beam. Furthermore, these performance advantages are achieved with reduced sensitivity to over-etching that may occur during partial etching processes due to process variations.

Figure 2:
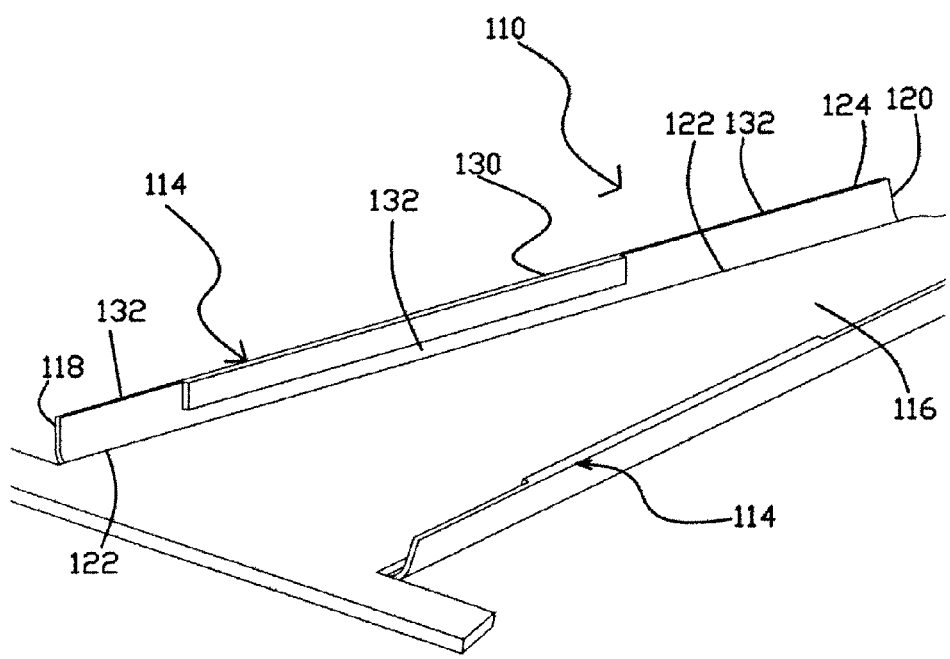
FIG. 2 is an isometric view of a portion of a load beam having rails in accordance with another embodiment of the invention.

FIG. 2 is an illustration of a portion of a load beam 110 having a central or base region 116 and rails 114 in accordance with another embodiment of the invention. Rails 114 extend from the side edges of the base region 116 and have a proximal end 118, a distal end 120, a base edge 122 adjacent to the base region of the load beam 110, and a free or tip edge 124. With the exception of the differences described below, load beam 110 can be substantially the same as or similar to load beam 10 described above, and similar features are identified by similar reference numbers. As shown, the rails 114 include a first thickness portion 130 in the form of a single beam structure having a first thickness, and second thickness portions 132 having a non-zero second thickness that is less than the first thickness. The beam of first thickness portion 130 is located generally in the middle of the load beam 110, adjacent to the tip edge 124. Second thickness portions 132 are therefore located between the beam of first thickness portion 130 and the proximal end 118 and distal end 120 of the rail 114. In the embodiment shown, the beam of first thickness portion 130 does not extend all the way to the base edge 122. Second thickness portions 132 are located between the beam of first thickness portion 130 and the base edges 122 of the rails. First thickness portion 130 and second thickness portions 132 both cover substantial portions of the rails 114 and provide substantial contributions to the operational performance of the load beam 110.

Load beam 110 and rails 114 can be manufactured in a manner similar to those of load beam 10 and rails 14 described above. The structure of rails 114 can also be varied in manners such as those described above in connection with rail 14. For example, although the beam of the first thickness portion 130 is shown as an elongated rectangle, it can take other shapes. In general, rails 114 are optimized to add stiffness at locations susceptible to bending during the first bending mode, while at the same time offering substantial shock performance. In other embodiments of the invention (not shown), the rails are optimized additionally or alternatively for other bending modes. Load beam 110 offers performance advantages similar to those described above in connection with load beam 10.

Figure 3:
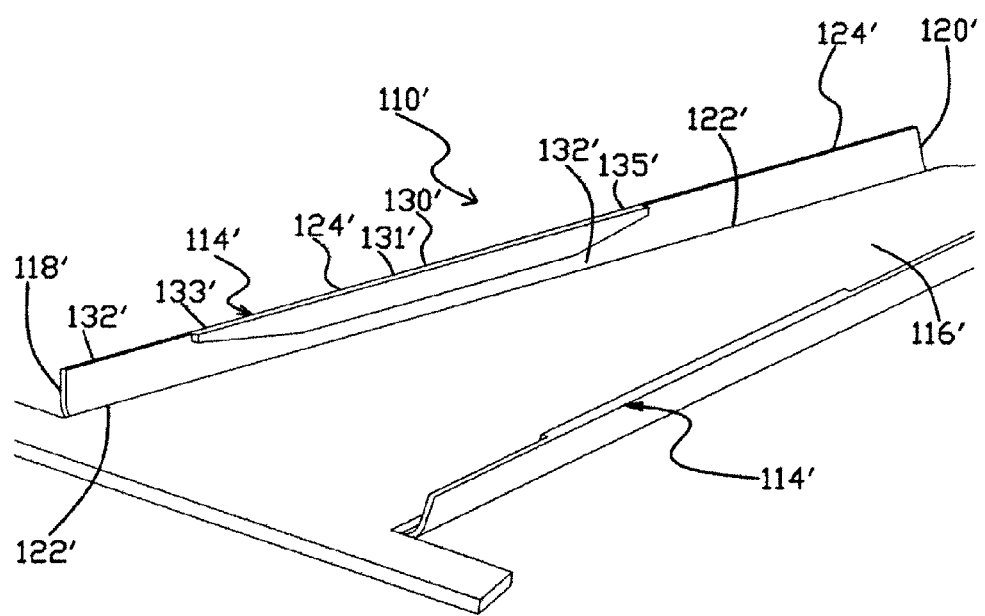
FIG. 3 is an isometric view of a portion of a load beam having rails in accordance with yet another embodiment of the invention.
Figure 4:
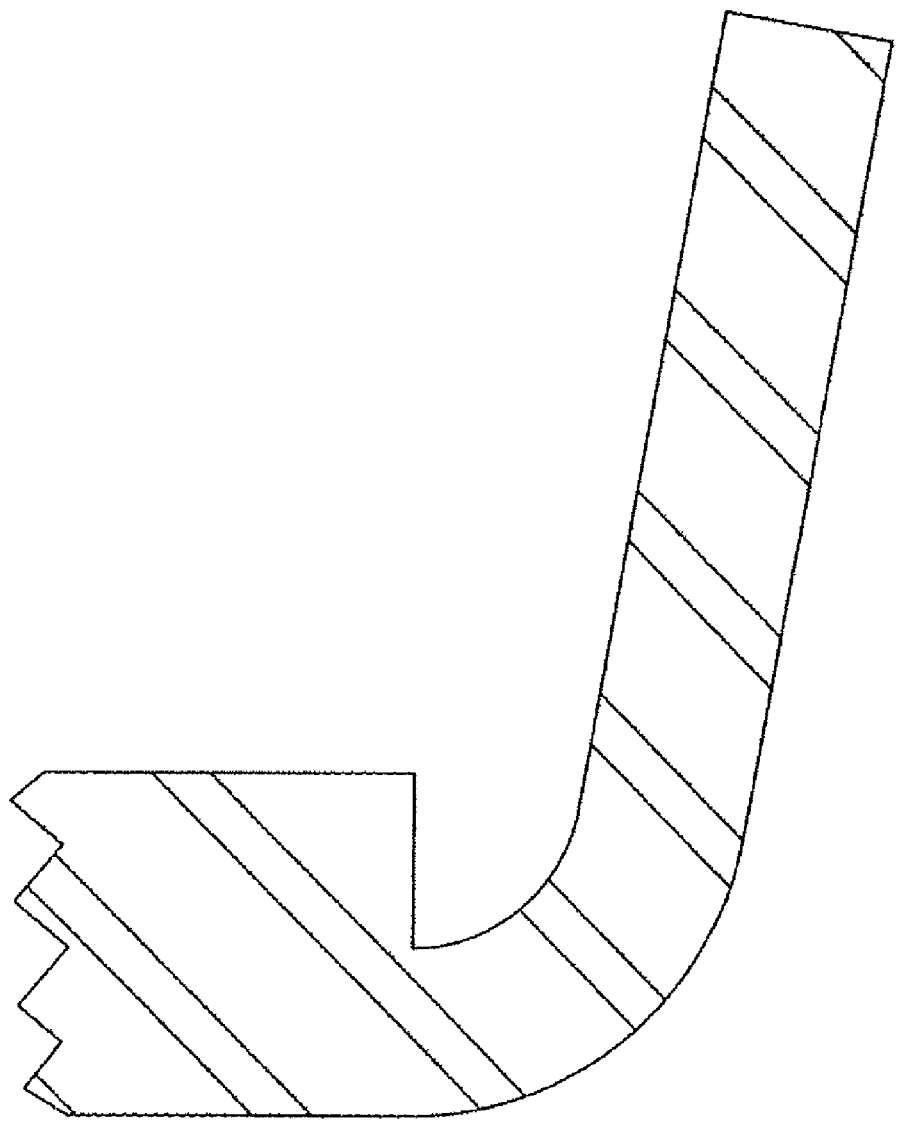
FIG. 4 is a cross sectional illustration of a portion of a prior art load beam having a full partial etch rail.
Figure 5:
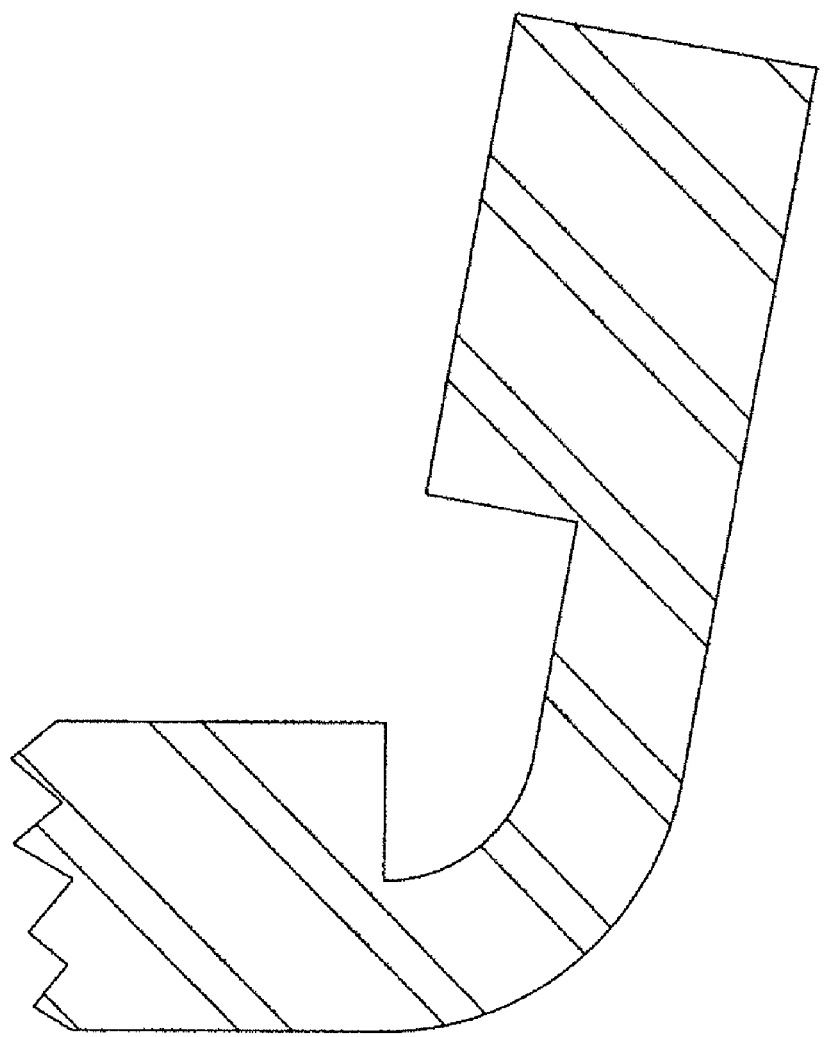
FIG. 5 is a cross sectional illustration of a portion of a prior art load beam having a rail with a partial etch channel and full thickness tip.

FIG. 3 is an illustration of a portion of a load beam 110' having rails 114' in accordance with yet another embodiment of the invention. With the exception of the differences described below, load beam 110' can be substantially the same as or similar to load beam 10 described above, and similar features are identified by similar reference numbers. The central or middle section 131' of the beam of first thickness portion 130' has a generally elongated rectangular shape. The heights of the proximal end section 133' and the distal end section 135' of the beam of first thickness portion 130' taper or reduce with increasing distance from the middle section 131'. In the embodiment shown the height of the proximal and distal end sections 133' and 135' reduces in a continuous function, but other (e.g., step function) height reduction tapers can be used in other embodiments (not shown). Load beam 110' and rails 114' can be manufactured in a manner similar to those of load beam 10 and rails 14 described above. The structure of rails 114' can also be varied in manners such as those described above in connection with rail 14. For example, although the beam of the first thickness portion 130' is shown as an elongated rectangle, it can take other shapes. In general, rails 114' are optimized to add stiffness at locations susceptible to bending during the first bending mode, while at the same time offering substantial shock performance.

Although the present invention has been described with reference to preferred embodiments, those skilled in the art will recognize that changes can be made in form and detail without departing from the spirit and scope of the invention. For example, the invention can be incorporated into a beam region of a load beam also having spring and mounting regions. Alternatively, the invention can be a beam component that is welded or otherwise assembled onto a hinge or spring in other manufacturing operations. In still other embodiments the invention can be incorporated into other head suspension components.

What is claimed is:

1. A head suspension load beam or load beam component including a base region and mechanically formed rails extending from the base region, the rails having straight sections with bent base edge portions and tip edge portions, the tip edge portions having a first planar surface and a second surface opposite the first surface, wherein the tip edge portions of the straight sections of the rails have thicknesses that vary along a length of the rails, the tip edge portions of the straight sections of the rails including one or more first thickness portions having a first thickness and one or more second thickness portions having a second thickness that is less than the first thickness and wherein the first thickness portions of the rails are spaced from the base region by base edge portions having the second thickness.

2. The load beam or load beam component of claim 1 wherein a middle portion along the length of the rails is thicker than proximal and distal end portions of the rails.

3. The load beam or load beam component of claim 2 wherein the thickness of the rails varies along a height of the rails.

4. The load beam or load beam component of claim 3 wherein a tip edge portion along the height of the rails is thicker than a base edge portion of the rails.

5. The load beam or load beam component of claim 1 wherein the thickness of the rails varies as a step function along a length of the rails.

6. The load beam or load beam component of claim 5 wherein the thickness of the rails varies along a height of the rails.

7. The load beam or load beam component of claim 6 wherein a tip edge portion along the height of the rails is thicker than a base edge portion of the rails.

8. The load beam or load beam component of claim 1 wherein the thickness of the rails varies continuously over at least a portion of the length of the rails.

9. The load beam or load beam component of claim 8 wherein the thickness of the rails varies along a height of the rails.

10. The load beam or load beam component of claim 9 wherein a tip portion along the height of the rails is thicker than a base portion of the rails.

11. A head suspension load beam or load beam component having a base region and mechanically formed rails extending from the base region formed from a sheet of material having a first thickness, wherein the rails have straight sections with bent base edge portions and tip edge portions, the tip edge portions having a first planar surface and a second surface opposite the first surface, and wherein portions of the second surface of the rails are partial etched to a non-zero second thickness that is less than the first thickness such that tip edge portions of the straight sections of the rails have thicknesses that vary between the first and second thickness along a length of the rails, the tip edge portions of the straight sections of the rails including one or more first thickness portions having a first thickness and one or more second thickness portions having the second thickness, and wherein the first thickness portions of the rails are spaced from the base region by base edge portions having the second thickness.

12. The load beam or load beam component of claim 11 wherein the rails consist of the first thickness portions having the first thickness and the second thickness portions having the second thickness.

13. The load beam or load beam component of claim 12 wherein the first thickness portions include a plurality of structures spaced-apart from one another along a length of the rails by the second thickness portions.

14. The load beam or load beam component of claim 13 wherein the spaced-apart structures are polygons.

15. The load beam or load beam component of claim 13 wherein the spaced-apart structures are located on a tip edge portion of the rails and a base edge portion of the rails include the second thickness portions.

16. The load beam or load beam component of claim 12 wherein the rails include a single first thickness portion located in a middle portion of the rails between proximal and distal end portions of the rails, and the proximal and distal end portions of the rails include the second thickness portions.

17. The load beam or load beam component of claim 16 wherein the first thickness portion has a constant height.

18. The load beam or load beam component of claim 17 wherein the first thickness portion is located on a tip edge portion of the rails and a base edge portion of the rails include the second thickness portions.

19. The load beam or load beam component of claim 16 wherein the first thickness portion has a middle section and a height that varies between the middle section and distal and/or proximal ends of the first thickness portion.

20. The load beam or load beam component of claim 19 wherein the height of the first thickness portion decreases with increasing distance from the middle section to the distal and/or proximal ends of the first thickness portion.

* * * * *